G. WAGNER.
SPEED LIMIT WARNING AND THEFT ALARM.
APPLICATION FILED SEPT. 18, 1916.
1,275,330.
Patented Aug. 13, 1918.
2 SHEETS—SHEET 1.
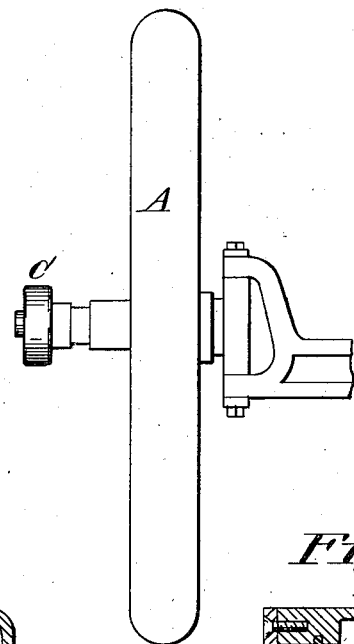
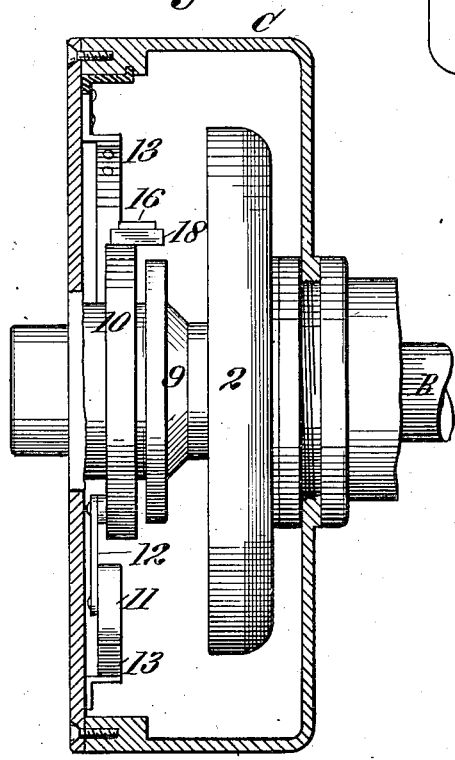
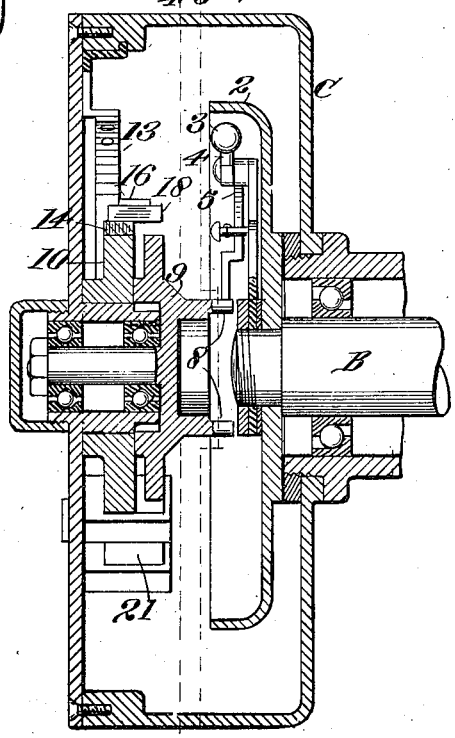
WITNESSES:
Charles Rhodes
Thos Castberg
INVENTOR
George Wagner.
BY Strong & Townsend
ATTORNEYS G. WAGNER.
SPEED LIMIT WARNING AND THEFT ALARM.
APPLICATION FILED SEPT. 18, 1916.
1,275,330.
Patented Aug. 13, 1918.
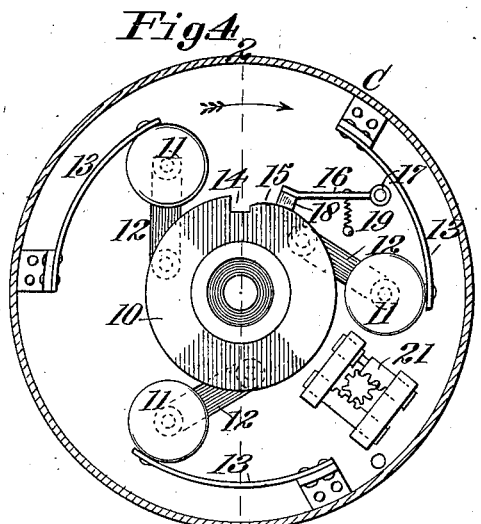
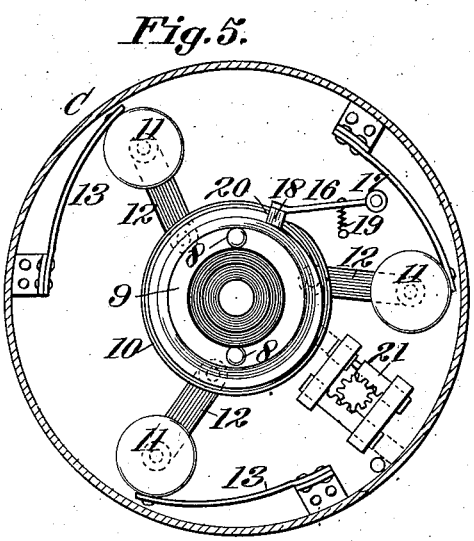
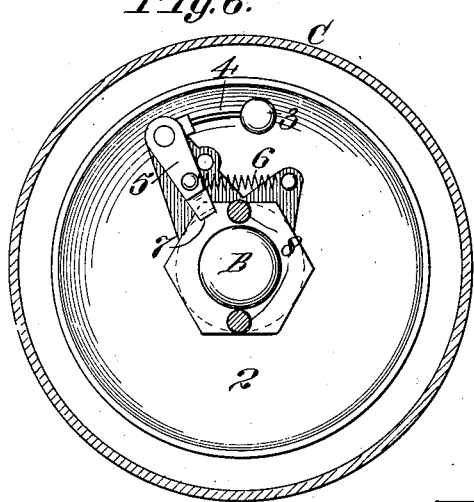
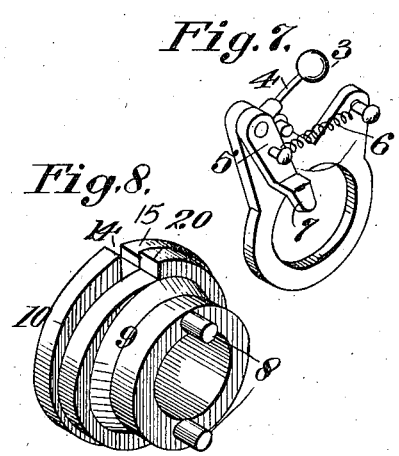
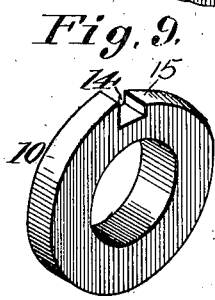
INVENTOR
George Wagner.
BY Strong & Townsend
ATTORNEYS

UNITED STATES PATENT OFFICE.

GEORGE WAGNER, OF OAKLAND, CALIFORNIA, ASSIGNOR OF ONE-HALF TO JULIUS A. BORKMAN, OF OAKLAND, CALIFORNIA.

SPEED-LIMIT WARNING AND THEFT ALARM.

1,275,330.

Specification of Letters Patent.   Patented Aug. 13, 1918.

Application filed September 18, 1916.   Serial No. 120,651.

*To all whom it may concern:*

Be it known that I, GEORGE WAGNER, a citizen of the United States, residing at Oakland, in the county of Alameda and State of California, have invented new and useful Improvements in Speed-Limit Warnings and Theft Alarms, of which the following is a specification.

This invention relates to a warning device, designed to call attention when the legal rate of speed is exceeded by an automobile or other vehicle, and also to sound an alarm whenever an attempt is made to move the machine without permission.

It consists of a gong centrally fixed to an axle and having a concave rim, a hammer mounted in line with the gong, tension devices which prevent the hammer from striking the gong while the car speed is within the legal limit, tripping mechanism which causes the hammer to strike when the legal speed is exceeded, and means to retain this mechanism in operative position as long as the high speed is continued. It also includes means to retain the mechanism in such operative condition that the car cannot be started without sounding the alarm, unless the latter is unlocked.

The invention consists of the parts and the construction and combination of parts as hereinafter more fully described and claimed, having reference to the accompanying drawings, in which—

Figure 1 is a detail view of the front wheel of an automobile, showing the invention applied to the hub.

Fig. 2 is an enlarged vertical section on line 2—3 of Fig. 4, showing the operating parts in elevation.

Fig. 3 is an enlarged vertical section on line 2—3 of Fig. 4, showing the operating parts in section.

Fig. 4 is a vertical section on line 4—5 of Fig. 3 with the ball operating mechanism partly removed.

Fig. 5 is a vertical section on line 4—5 of Fig. 3, showing the cams engaged to operate the bell continuously.

Fig. 6 is a vertical section on line 6—6 of Fig. 3 looking toward the bell.

Fig. 7 is a perspective view of the clapper mechanism.

Fig. 8 shows the shoulder 20 in position to be engaged by the head 18.

Fig. 9 is a perspective view of the locking cam.

In the present illustration, my device is connected with a front wheel A, turnable upon the non-revoluble spindle B, upon which the wheel turns with the usual antifrictional bearings. A gong or alarm 2 is fixed to the end of the spindle and is not revoluble. A hammer 3 is so mounted, with relation to the gong, (which is here shown as concave) that it may be caused to strike the gong whenever the speed limit is exceeded.

As shown in this construction, the arm 4 of the hammer is fixed to the fulcrumed or hub end of a lever 5, and the hammer is normally held out of contact with the gong by a spring 6. The inner end 7 of the arm extends toward the center to such a point that it may be engaged by pins 8, carried by a cam 9, when the cam is revolved, and the hammer is thus withdrawn and released, so that the spring 6 will cause it to strike the bell.

The bell hammer is actuated by the following mechanism: C is a cylindrical case in which the bell and other parts are inclosed. The inner end of this case is fixed to the wheel hub and the case is revoluble with the wheel, as shown in Fig. 3.

Within the case is a cam 10 mounted upon antifrictional bearings, as shown in Fig. 3, and freely turnable upon the extension of the fixed spindle B, and between the cam 10 and the bell is a cam 9 having pins 8 projecting from its face so as to engage the arm 7 when the cam 9 is revolved. This cam is mounted upon the stationary spindle B and is only revolved by connection with the revolving cam 10 as follows: Fixed to the inner periphery of the case C are springs 13. The opposite ends of these springs are secured to weights 11, as shown in Figs. 4 and 5. 12 are arms which connect the weights with the periphery of the cam 10.

The springs 13 have sufficient tension to force the weights 11 toward the center of the case, and thus cause the lever arms 12, which are connected tangentially with the cam 10, to rotate the cam to the left, as shown in Fig. 4. This action is effected because the forcing of the weights 11 to a point nearer the center of the case must act to rotate the cam in a backward direction.

The periphery of the cam has a notch 14 formed in it and the surface of the cam to the right of the notch is formed so that this surface approaches the center, near the notch, as shown at 15. An arm 16 is fulcrumed at 17 and carries upon its opposite end a head 18 which is caused to rest upon the periphery of the cam by means of a spring 19 which is sufficiently strong to overcome any centrifugal tendency of the head 18.

When the speed of the car and the rotation of the casing C reach too great a point, the movement of the weights 11 will be sufficiently strong to overcome the tension of the spring 13 and as they move outward they will pull the cam to the right through the action of the arms 12 and this causes the head 18 to slide along the portion 15 of the cam and to gradually approach the notch 14. The head 18 extends across the face of the cam 10 and also extends over the cam 9 which is of a little smaller diameter than the cam 10 and which will not be engaged by the head 18 until the latter has approached the center by following the surface 15 until it is sufficiently depressed to engage the shoulder 20 of the cam 9, and when this occurs the cam 9 will be caused to revolve and through its projecting studs 8 will engage the hammer-actuating lever and sound the alarm.

It will be manifest that a reduction of the speed of the car, when the occupant hears the alarm, will, by reason of the slower revolution of the parts, allow the springs 13 to overcome the centrifugal action of the weights 11 and thus, through the connection of the arms 12 with the cam 10, to force the latter to revolve toward the left, and this causes the head 18 to move up the incline 15 until it is out of engagement with the shoulder of the cam 9 and the latter ceases to revolve.

If, however, the warning is disregarded and the speed further increased, the cam 10 will be rotated further, until the head 18 falls into the notch 14 and locks the cam, so that the alarm will continue to sound and cannot be stopped until the car is stopped and backed a revolution of the wheel to disengage the head 18 out of engagement and allow the parts to return to their normal position.

Variations of speed within legal limits will cause the weights 11 to move radially by centrifugal force and the arms 12 will act to rotate the cam 10 about its axis and this will allow the head 18 to slide in either direction upon the cam surface 15. The tension of the spring 19 is sufficient to overcome centrifugal force and to retain the head 18 in sliding contact with the cam 15 until the speed becomes so great as to turn the cam far enough to allow the head 18 to fall into the notch 14, from which it can only be removed by stopping the car and lifting the head out of the notch, when the springs 13 will act to return the cam to its usual position.

As shown in Figs. 4 and 8, the shoulder 20 of the cam 9 is of less elevation than that of the notch 14 of the cam 10, but it is high enough to allow the head 18 to engage it, while still resting upon the part 15 of the cam 10, and the oscillation of the cam beneath the head 18 will thus engage or disengage the head with the shoulder 20 unless the speed is increased so that the head drops into the notch 14, when the cams will be permanently locked in position and any movement of the car will be transmitted through both cams to the signal.

When it is desired to leave the car and prevent its being moved without notice, the bolt 21 may be shifted against the periphery of cam 9 as indicated by dotted lines in Fig. 5 so that the rotation of the wheel will effect rotation of the cam and operation of the hammer, the end of said bolt being cut away or formed so as to extend inwardly beyond the periphery of cam 10.

Having thus described my invention, what I claim and desire to secure by Letters Patent is—

1. A speed limit warning attachment for vehicles, including a wheel and bearing axle, a fixed circular gong concentric with the axle spindle, a cam turnable upon the wheel axle and having a peripheral notch, centrifugally acting weights with arms connected with the cam, a second cam with projecting pins, a gong hammer having a trip arm in the line of revolution of the pins, and means controlled by the movements of the weights to cause the cams to turn in unison.

2. In a wheel attachment of the character described, an axle and a wheel turnable thereon, a fixed gong member concentric with the axle, a revoluble weight member movable by centrifugal action, a cam to which the weight member is pivoted and by the movements of which the cam is oscillated, said cam having a peripheral notch, a second notched cam with projecting pin lugs, a fulcrumed hammer, with the arm of which the lugs may contact, and means whereby the cams may be connected to revolve together and actuate the hammer.

3. A speed limit alarm comprising in combination with a vehicle wheel, a stationary gong, a fulcrumed tiltable hammer, a cam having pin lugs adapted to engage and actuate the hammer when a certain speed of revolution is exceeded, a weight member extensible by centrifugal force in unison with the revolution of the wheel, a second cam to which the arm of the weight is pivoted provided with a notch and an incline leading down one side thereof, said first cam having a depression registrable with the cam notch, and an arm having a part for riding on the incline and down into the notch of the second cam and the depression of the first cam to connect the two cams.

4. The combination with a wheel revoluble upon a non-revoluble spindle, of a gong fixed to and concentric with the spindle, a hammer fulcrumed to swing into contact with the gong, a cam with projecting pins adapted to engage and actuate the hammer, said cam having a notch in its periphery, a second cam parallel with the first, and also having a peripheral notch, a fulcrumed spring-pressed arm with a head resting upon the cams, and centrifugally acting weights with connections by which the second cam is rotated to allow the spring-pressed head to engage the notch of the first cam and rotate it to cause the pins to engage the hammer lever.

5. In a speed alarm attachment of the character described, a revoluble wheel, centrifugally expansible weight members revoluble in unison with the wheel, a cam, and arms connecting it with said members so that the movement of the weight members partially rotates the cam, a second parallel cam with a peripheral shoulder, a spring-pressed arm with a head contacting with the cams and engaging the incline of the first named cam to allow the head to depress and engage and rotate the second cam when the first cam face passes beneath the coacting head, pins projecting from the second cam, an oscillating hammer which is set in motion by the pins, and a fixed gong with which the hammer contacts.

6. In a speed limit alarm, rotary means having a relatively rotary member, centrifugally operated means for turning said member, a gong, means for sounding the latter including a member rotatable by said first means but normally inoperatively related thereto, and means for operatively connecting said members when the first member is turned by said centrifugal means.

7. In a speed limit alarm, rotary means having a relatively rotary member, centrifugally operated means for turning said member, a gong, means for sounding the latter including a member rotatable by said first member but normally inoperatively related thereto, said first member having a cam surface and the second member having a shoulder, and means adapted to ride on the cam surface, when said first member is turned by the centrifugal means, into the path of the shoulder to engage the same and connect the members.

8. In a speed limit alarm, a driving rotatable member, a driven rotatable member arranged adjacent the same and normally inoperatively related thereto, each member having a depression normally out of registry, centrifugal means for moving one member to bring the depressions into registry, means movable into the registered depressions for connecting the member, and a signal operable by said driven member.

In testimony whereof I have hereunto set my hand in the presence of two subscribing witnesses.

GEORGE WAGNER.

Witnesses:
JOHN H. HERRING,
W. W. HEALEY.